(12) United States Patent
Dufosse

(10) Patent No.: US 6,246,763 B1
(45) Date of Patent: Jun. 12, 2001

(54) MOBILE TELEPHONE CASING

(75) Inventor: Stéphane Dufosse, Cormeilles en Parisis (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/336,592

(22) Filed: Jun. 21, 1999

(30) Foreign Application Priority Data

Jun. 22, 1998 (FR) .................................................. 98 07832

(51) Int. Cl.⁷ ...................................................... H04M 1/00
(52) U.S. Cl. ............................................. 379/433; 379/420
(58) Field of Search .................................. 379/420, 433, 379/428; 455/90, 575

(56) References Cited

U.S. PATENT DOCUMENTS 5,402,486    3/1995   Wang et al. .

6,104,808 *  8/2000   Alameh et al. ...................... 379/420

FOREIGN PATENT DOCUMENTS

| 1 016 716 | 1/1996 | (GB) . |
| 61-123388 | 6/1986 | (JP) . |
| WO 97/47117 | 12/1997 | (WO) . |

* cited by examiner

Primary Examiner—Jack Chiang
(74) Attorney, Agent, or Firm—Sughrue, Mion, Zinn, Macpeak & Seas, PLLC

(57) ABSTRACT

Acoustic leakage between a sound diffusion region of a mobile telephone, opposite a loudspeaker, and another region of the casing, open to the open air, solves the problem of overamplification of low frequencies when the casing is pressed against the listener's ear. The gain in the pass-band is modified in an expected direction only when the user presses the mobile telephone against his or her ear for private listening.

3 Claims, 1 Drawing Sheet

MOBILE TELEPHONE CASING

BACKGROUND OF THE INVENTION

1. Field of the Invention

The present invention concerns a casing for a mobile telephone usable in a public network or in a private installation. More generally, the invention concerns all casings that reproduce a sound message and that may need to be pressed against the ear.

2. Description of the Prior Art

Existing mobile telephones incorporate a loudspeaker to emit sound opposite a perforated area of a casing. The user places this area, and therefore the loudspeaker, near or against his or her ear in order to hear messages. To make it possible to use a casing of this type in "hands free" mode, it is possible to switch the mobile telephone to a mode in which the loudspeaker emits the message with sufficient power to be heard all around. These two modes of use have mutually contradictory constraints.

If the user has the casing pressed against his or her ear, for personal listening, low-frequency components of the message transmitted to the user are overamplified. Thus a standard requires the amplitude within an audible frequency band to be contained within specified limits. This makes it necessary to be able to filter the low-frequency components to reduce their amplitude. The electronic filtering usually employed requires the interpolation of a filter for processing the signal before it is converted into an audible message.

In hands free listening, on the other hand, low-frequency components are necessary for effective diffusion of the signal into a large space, for example an office. Accordingly, on changing from one mode of use to the other it is necessary to switch low-frequency filters into or out of service.

In practice, the cost of the filters adds to the price of the device.

Creating acoustic leakage in the perforated area of the casing to establish communication between the open air and a cavity formed between the loudspeaker and an inside face of the casing against which the loudspeaker is pressed, in order to damp low frequencies, is known per se. With a solution of this kind, compliance with the limits of the standard unfortunately cannot be obtained without adding a complementary electronic filter.

SUMMARY OF THE INVENTION

The aim of the invention is to remedy the above drawback by proposing a completely different way of damping low-frequency sound components, according to whether the casing is pressed against the listener's ear for private listening or held away from the ear for hands free listening. In accordance with the invention, a leakage passage is provided in a perforated area of the casing opposite the loudspeaker. A mouth of the leakage passage is in a cavity formed by the external part of the casing and the listener's ear (rather than one formed by an inside face of the casing and a loudspeaker diaphragm). An orifice at the other end of the passage is outside this area, in the open air. This creates acoustic leakage having the beneficial effect of damping low-frequency components. Furthermore, in accordance with the invention, the leakage occurs only if a cavity is formed between the casing and the listener's ear. This occurs only if the listener has the casing pressed against his or her ear, for private listening.

The invention therefore consists in mobile telephone casing having a perforated region to transmit sounds produced by the mobile telephone and in which this region includes an acoustic passage to connect a mouth on an outside face of the casing in this region to an orifice outside this region.

The invention will be better understood after reading the following description and examining the accompanying drawing. The drawing is given by way of example only and is in no way limiting on the invention.

DETAILED DESCRIPTION OF THE PREFERRED EMBODIMENT

Figure 1:
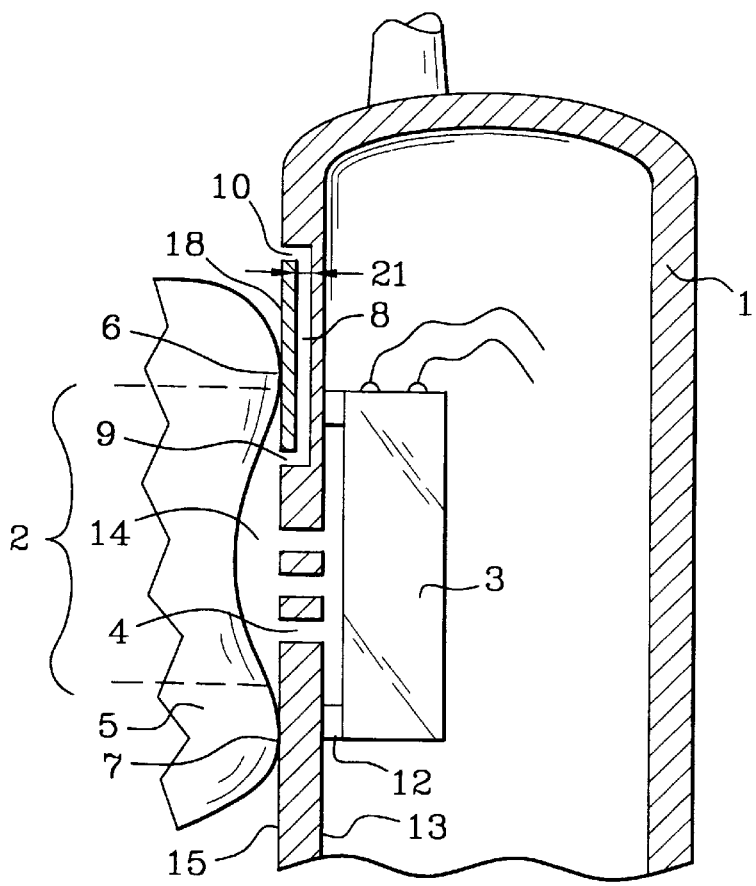
FIG. 1 shows a casing in accordance with the invention in section.

FIG. 1 shows a mobile telephone casing 1 in section. The casing 1 has a perforated region 2 for transmitting sounds produced by a loudspeaker 3 of the mobile telephone. The sounds produced by the loudspeaker 3 are transmitted via perforations 4 to an ear 5 of a listener. For private listening the ear 5 is pressed against the casing 1, for example in contact areas 6 and 7 on either side of and all around the area 2. In accordance with the invention, the area 2 incorporates an acoustic passage 8. The passage 8 connects a mouth 9 on an outside face of the casing 1 to an orifice 10. The mouth 9 is inside the area 2 and the orifice 10 is outside it, in other words outside the contact areas 6 and 7. The loudspeaker 3 is fixed against the inside face 13 of the casing 1, for example by means of a circular bead 12 of adhesive.

Acoustic leakage via the passage 8 has the following effect. When the listener presses his or her ear 5 against the casing 1, the passage 8 connects to the open air a cavity 14 formed between the outside face 15 of the casing 1 and the ear 5 of the listener. Under these conditions, it appears that the gain in the audible band is significantly reduced for low frequencies and increased for high frequencies. The gain in the wanted band is then substantially constant, with a tolerance of ±3 dB according to the frequency range. It naturally conforms to the limits of the standard.

On the other hand, if the ear 5 of the listener is not pressed against the casing 1, low frequencies are naturally subjected to significant overamplification, in the order of around 10 dB at frequencies in the range 300 Hz to 1 000 Hz. This automatically facilitates diffusion of the sound into free space.

Figure 2:
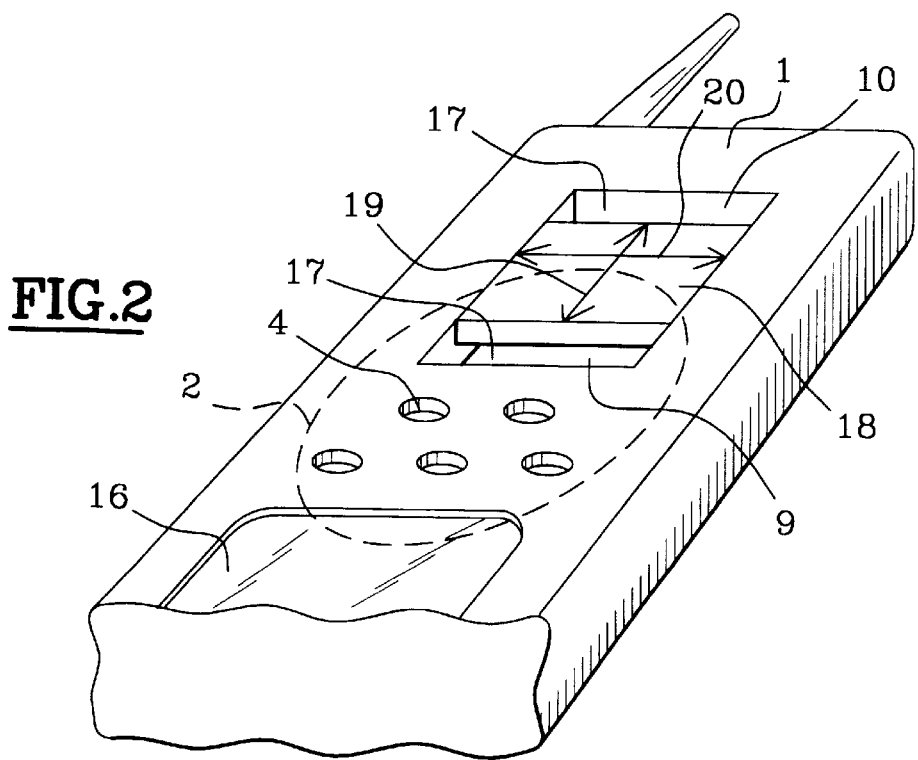
FIG. 2 shows the same casing in perspective.

FIG. 2 shows in perspective the same components as FIG. 1. The casing 1 of the mobile telephone has, above a screen 16, the area 2 shown in dashed outline in which the perforations 4 are formed. FIG. 2 shows that the passage 8 is in the form of a cavity 17 covered, between the mouth 9 and the orifice 10, by a plate 18. The plate 18 covers the cavity imperfectly and leaves on either side of it openings constituting the mouth 9 and the orifice 10. The plate 18 can be held over the cavity 17 by gluing lateral edges of the plate 18 to the walls of the cavity, by clipping or by any other means. In practice the plate 18 has the shortest possible length 19, i.e. the shortest possible distance between the mouth 9 and the orifice 10. The shorter the length 19, the greater the effect on low frequencies. In one example, the length 19 is in the range from 5 mm to 10 mm.

The width 20 of the plate 18, measured perpendicular to the length 19, is in the order of 10 mm. The sections of the mouth 9 and the orifice 10 are in the order of 0.3 mm to 0.5 mm multiplied by the width 20. Likewise, the thickness 21 of the passage 8 is also 0.5 mm in one example. To prevent the cavity 17 reducing the thickness of the casing 1 at the location of the passage 8, the casing 1 can be recessed toward the inside of the mobile telephone so that its visible outside face is substantially flat. The thickness of the envelope of the casing is in the order of 1.5 mm.

The embodiment of the passage 8 with a cavity 17, a mouth 9 and an orifice 10 shown is a preferred embodiment.

There is claimed:

1. A mobile telephone casing including a loudspeaker mounted in said casing and a perforated region opposite said loudspeaker for transmitting sounds produced thereby to a listener in a private listening mode in which said listener presses his or her ear against said casing in said perforated region or in a hands free listening mode in which said ear of said listener is removed from said casing, wherein the external part of said casing forms a cavity with said ear of said listener in a private listening mode and said casing comprises an acoustic passage, one end of which opens into said cavity formed by said outside part of said casing and said ear of said listener in said private listening mode and the other end of which is open to the open air.

2. The casing claimed in claim 1 wherein said passage includes a cavity formed within the thickness of said casing and a plate imperfectly covering said cavity to leave a mouth and an orifice at respective ends of said passage.

3. The casing claimed in claim 1 wherein the inside face of said casing at the location of said perforations adheres to a loudspeaker.

* * * * *